United States Patent [19]

Ny

[11] Patent Number: 4,931,984
[45] Date of Patent: Jun. 5, 1990

[54] FILE DATA RETRIEVING SYSTEM USING RETRIEVAL-USE-IMAGE DATA

[75] Inventor: Yoshihide Ny, Yokohama, Japan

[73] Assignee: Ricoh Company, Ltd., Tokyo, Japan

[21] Appl. No.: 222,798

[22] Filed: Jul. 22, 1988

[30] Foreign Application Priority Data

Jul. 31, 1987 [JP] Japan ................................ 62-192291

[51] Int. Cl.⁵ ............................................. G06F 15/40
[52] U.S. Cl. .................................. 364/900; 364/920.7; 364/925.6; 364/927.2; 364/927.4; 364/928; 364/951.1; 364/951.3; 364/952.1; 364/963; 364/964
[58] Field of Search ............................... 364/200, 900

[56] References Cited

U.S. PATENT DOCUMENTS

| | | | |
|---|---|---|---|
| 4,203,154 | 5/1980 | Lampson et al. | 364/900 X |
| 4,758,980 | 7/1988 | Tsunekawa et al. | 364/900 |

FOREIGN PATENT DOCUMENTS

| | | |
|---|---|---|
| 0237324 | 9/1987 | European Pat. Off. . |
| 19458 | of 1974 | Japan . |
| 55046 | of 1982 | Japan . |
| 66744 | of 1984 | Japan . |
| 200378 | of 1984 | Japan . |
| 214959 | of 1984 | Japan . |

*Primary Examiner*—Raulfe B. Zache
*Attorney, Agent, or Firm*—Cooper & Dunham

[57] ABSTRACT

A file data retrieving system includes a filing device for storing file data and retrieval-use-image data used for retrieving file data. The file data is stored in a predetermined data form. The retrieval-use-image data has an image density smaller than that of the file data. The system also has an image data reproducing circuit for reproducing image data to be displayed from each of the file data and the retrieval-use-image data. Further the system has a display unit for displaying the image data supplied from the image data reproducing circuit. The display unit displays the image data reproduced from the retrieval-use-image data at the time of retrieval of the file data.

18 Claims, 11 Drawing Sheets

FIG. 4A
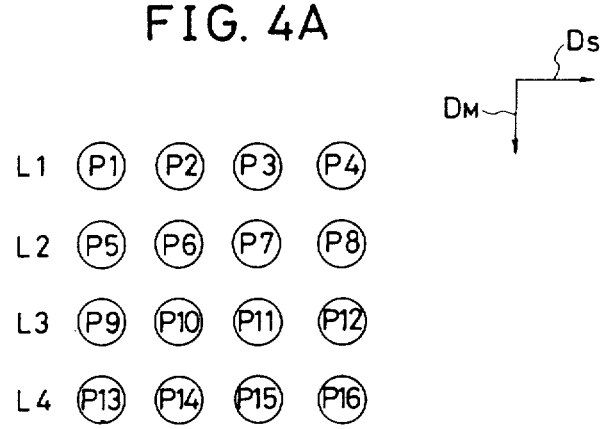
FIG. 4B
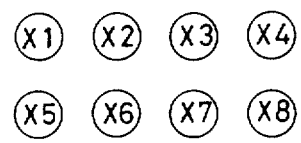
FIG. 4C    FIG. 4D
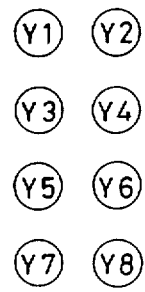  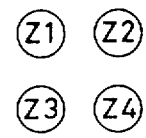

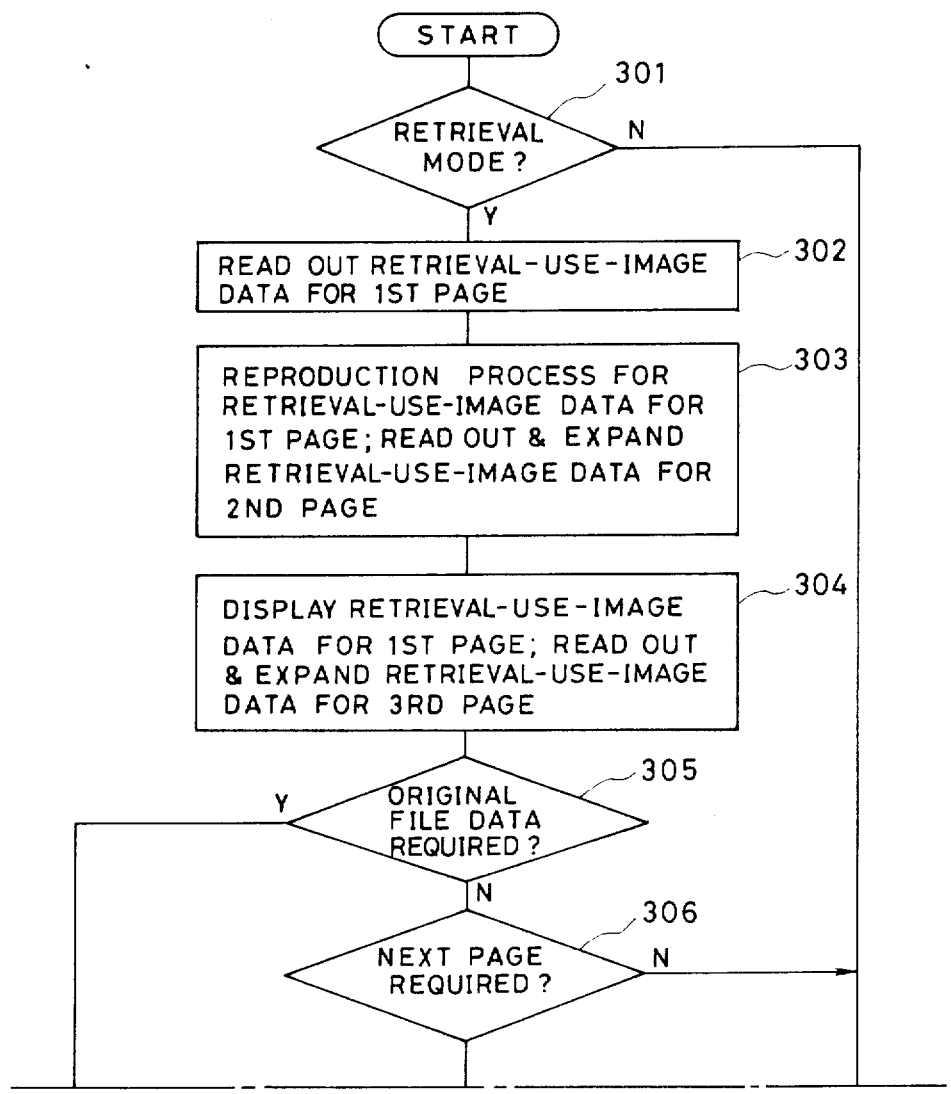

FILE DATA RETRIEVING SYSTEM USING RETRIEVAL-USE-IMAGE DATA

BACKGROUND OF THE INVENTION

The present invention generally relates to a file data retrieving system, and in particular to a file data retrieving system which can be suitably applied to a microcomputer system having a data filing function, such as an electronic filing system and a work station. The present invention relates more particularly to a file data retrieving system capable of retrieving desired data at a high speed by displaying data read out from a file.

A conventional microcomputer system having a data filing function includes a central processing unit, a memory, a filing device, a compression and reproduction device, an interface circuit, a display unit, a keyboard and a character code generating and expanding circuit. Generally the filing device is constructed by a floppy disc, a hard disc, an optical disc or the like. Data to be filed is stored in the filing device as it is, or converted data is stored in order to save the memory capacity of the filing device. For example, a character code of data to be filed is stored as file data in the filing device. Also, image data derived from an optical scanner, for example, is compressed and is then stored as file data in the filing device.

In the above microcomputer system, various manners for retrieving a file and file data included in the file have been proposed. For example, a desired file can be found by referring to a title (file name) or subtitle given thereto. The file retrieval may be also carried out by reading out file data from the filing device and then displaying it on the display unit. An operator can check from the displayed file data as to whether the file being accessed is a desired one. Generally, file data is displayed per one page out of pages which make up one file. This type of the retrieval is also used to retrieve file data of a desired page on a desired file.

Displayed file data, or an image on one page can be produced from corresponding character codes in the case where character codes are stored as file data in the filing device. In the case where the compressed image data is stored as file data in the filing device, displayed file data are obtained by expanding the compressed image data so as to reproduce the original image data. If the operator needs a display of file data of a page subsequent to file data being displayed, a corresponding instruction is supplied to the data retrieving system. Then, the system starts producing the file data on the next page to be displayed in the manner described above. In this manner, the files stored in the filing device and file data included in the files can be retrieved.

However, the conventional file data retrieval system has a disadvantage that a long time is taken to retrieve file data. This is because a data process for reading out file data which is stored in the form of character codes or compressed image data and then reproducing the file data to be displayed is carried out independently per one page. That is, the file data on the next page to be displayed for retrieval is produced in the process identical to that for the proceeding page after the instruction for displaying the next page data is supplied to the system. The above problem is particularly evident for compressed image data obtained by a data compression process such as modified Huffman (MH) coding, modified READ coding and modified MR ($M^2R$) coding. That is, a very long time in the order of a few seconds is taken to expand the compressed image data to reproduce the original image data to be displayed. Therefore, the operator must wait for a few seconds for the display of the file data on the next page to be displayed. The above problem also causes a complicated file management.

SUMMARY OF THE INVENTION

Accordingly, a general object of the present invention is to provide a novel and useful file data retrieving system in which the above disadvantage is eliminated.

A more specific object of the present invention is to provide a file data retrieving system capable of retrieving file data at a higher speed.

Another object of the present invention is to provide a file data retrieving system which can provide an easy file management.

The above objects of the present invention are accomplished by a file data retrieving system including the following elements. A filing device is used for storing file data and retrieval-use-image data used for retrieving file data. The file data is stored in a predetermined data form such as image data or character codes. The retrieval-use-file data has an image density smaller than that of the file data. The system also has an image data reproducing circuit for reproducing image data to be displayed from each of the file data and the retrieval-use-image data. Further the system has a display unit for displaying the image data supplied from the image data reproducing circuit. The display unit displays the image data reproduced from the retrieval-use-image data at the time of retrieval of the file data. The retrieval-use-image data has the image density smaller than that of the file data, and therefore a high-speed retrieval operation can be obtained.

The above objects can be also accomplished by a file data retrieving system including the following elements. A filing device is used for storing file data in a predetermined data form. At least two image data reproducing circuits have functions of reproducing image data to be displayed from the file data. A display unit is used for displaying the image data supplied alternatively from the two image data reproducing circuit at the time of retrieval of the file data. Because the image data to be displayed has been already prepared when the previous image data is being displayed, a high-speed retrieval operation can be obtained.

Other objects, features and advantages of the present invention will become apparent from the following detailed description when read in conjunction with the accompanying drawings.

BRIEF DESCRIPTION OF THE INVENTION

FIGS. 4A through 4D are views for explaining methods for producing the retrieval-use-image data;

FIG. 9 is a view showing how to combine FIGS. 9A and 9B; and

FIGS. 9A and 9B are flowcharts showing an operation of the embodiment of FIG. 7.

DETAILED DESCRIPTION OF THE PREFERRED EMBODIMENTS

A description is given of a preferred embodiment of the present invention with referece to FIGS. 1 through 6.

Figure 1:
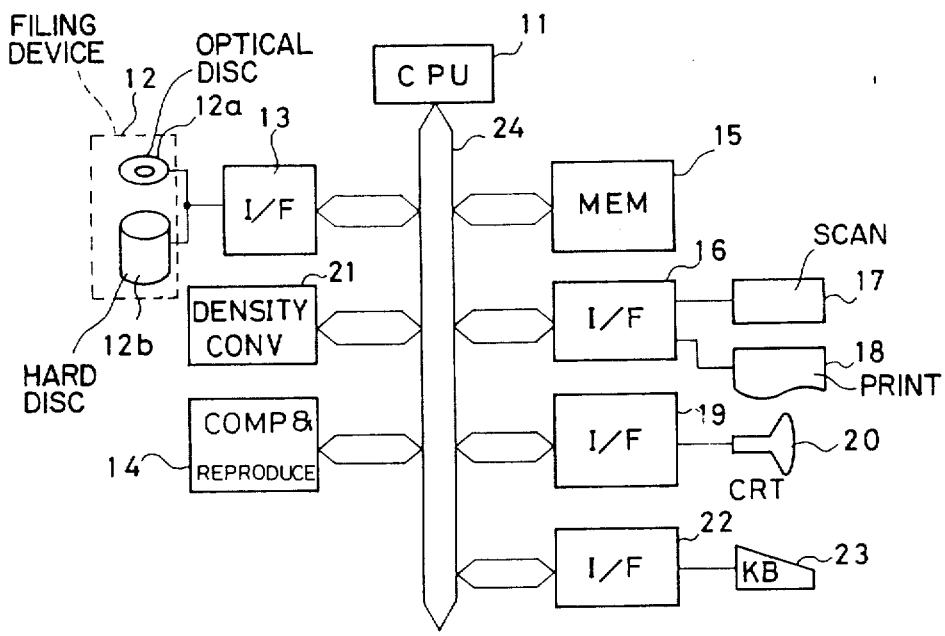
FIG. 1 is a block diagram of a preferred embodiment of the present invention.

Referring to FIG. 1, a file data retrieving system of the present embodiment includes a central processing unit 11 (hereafter simply referred to as CPU), a filing device 12, an interface circuit 13 (hereafter simply referred to I/F), a data compression and reproduction circuit 14, a memory 15, an I/F 16, a scanner 17, a printer 18, a I/F 19, a cathode-ray tube display unit (hereafter simply referred to as CRT unit), an image density converter 21, a keyboard I/F 22, and a keyboard 23. The I/Fs 13, 15, 16, 19 and 22, the CPU 11, the data compression and reproduction circuit 14, and the image density converter 21 are connected to a system bus 24.

The data compression and reproduction circuit 14 has a function of compressing original image data supplied thereto, and a function of expanding the compressed image data supplied thereto to reproduce the original image data. The data supplied to the data compression and the reproduction circuit 14 is derived from the scanner 17 or is produced from the data supplied from the keyboard 23. Image data from the scanner 17 is once stored in the memory 15, and is then transferred to the data compression and reproduction circuit 14. Data from the keyboard 17 is also stored in the memory 15. The CPU produces corresponding image data from the data from the keyboard. The produced image data is then supplied to the data compression and reproduction circuit 14. The above operations are carried out in the case where image data is stored as file data in the filing device. On the other hand, in the case where the data from the keyboard is stored in the form of corresponding character codes, the CPU 11 produces corresponding character codes from the data from the keyboard 23, and the produced character codes are stored in the filing device 12, as described later.

The filing device 12 includes an optical disc unit 12a and a magnetic hard disc unit 12b. Normally the optical and hard disc units 12a and 12b contain a plurality of optical and hard discs, respectively. The optical disc unit 12a is used for storing files. As described before, data of files is stored in the form of a character code or compressed image data. The compressed data is produced by the data compression and reproduction circuit 14. The character code is derived from a character generator (not shown) connected to the system bus 24. The optical disc unit 12a is also used for storing image data used for retrieving the file data. Hereafter, such data is referred to as retrieval-use-image data. The retrieval-use-image data has an image density smaller than that of the compressed data which is stored as file data in the optical disc unit 12a. The optical disc unit 12b is further used for storing a directory which is information necessary to manage files. As described later, the retrieval-use-image data is produced by image density conversion and data compression processes. The directory may be stored in the hard disc unit 12b. The hard disc unit 12b is also used for storing information such as the order of read-out of file data, which may be provided by an operator through the keyboard 23.

The filing device 12 may be constructed only the optical disc unit 12a or the hard disc unit 12b. In this following description, for the sake of simplicity, the compressed image data, the retrieval-use-image data and the directory are all stored in the optical disc unit 12a, and character codes are not used.

Figure 2A:
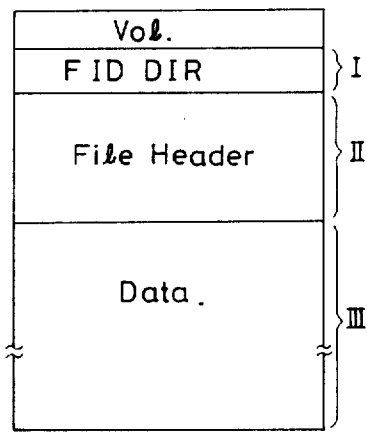
FIGS. 2A and 2B are views for explaining a manner for storing file data in an optical disc unit used in the block diagram of FIG. 1.
Figure 2B:
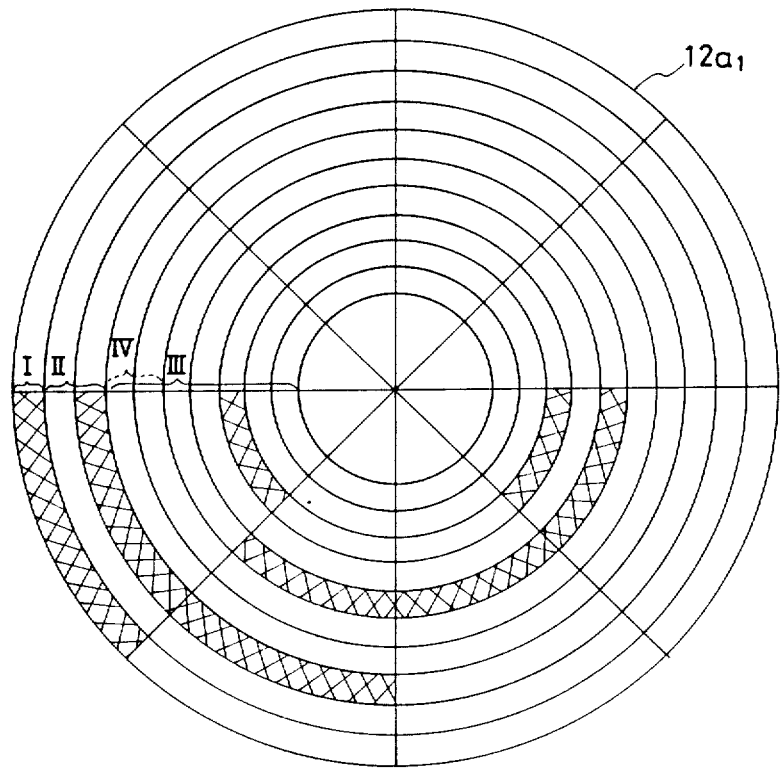

FIGS. 2A and 2B are views for explaining a method of storing the compressed image data (compressed file data) in one optical disc 12a₁ contained in the optical disc unit 12a. FIG. 2A is a memory space of the optical disc 12a₁, and FIG. 2B schematically shows tracks formed on a surface thereof. In FIG. 2A, "Vol" denotes a region in which there is stored a volume label used for discriminating the optical disc 12a₁ against other optical discs and identifying the optical disc 12a₁. "F ID DIR" denotes a file identification directory region labelled I in which the file identification directory is stored for each file. The file identification directory includes a name of the corresponding file and an address of a corresponding file header. "FILE HEADER" denotes a file header region labelled II. One file header indicates an address of a storage region in which there is stored data consisting of the corresponding file. "DATA" denotes a region in which data of the file is stored.

As shown in FIG. 2B, the optical disc 12a₁ is managed per a unit of sector. The file identification directory region I is provided in the outer circumferential portion I of the storage region of the optical disc 12a₁. The file header region II is provided just inside the region I, and the data region III is provided inside the file header region II. The compressed image data may be stored in the data region III at random. Data included in one file can be read out by finding a file header "B" from a file identification directory "A", and then finding data "C" from the file header "B".

In the present embodiment, there are provided two different methods for storing the retrieval-use-image data in the optical disc 12a₁. In the first method, the retrieval-use-image data is stored in the data region III. In this case, retrieval-use-image data can be designated by a corresponding data header which is stored along with the file header in the file header region II. In the second method, a region exclusively for successively storing the retrieval-use-image data is provided in a storage region of the optical disc 12a₁ adjacent to the file header region II. A region labelled IV denotes the region exclusively for storing the retrieval-use-image data. In this case, the desired retrieval-use-image data can be read out by designating the corresponding file identification directory.

In the first method, the retrieval-use-image data can be efficiently stored in the optical disc 12a₁. However, because the retrieval-use-image data may be stored at random as in the case of the compressed image data, a slightly longer time may be taken to retrieve the file data in the first method, compared to the second method. On the other hand, in the second method, the retrieval speed, particularly in the case where the file data is successively retrieved, can be greatly increased, compared to the first method. However, an efficiency in usage of the storage region of the optical disc $12a_1$ is slightly decreased, compared to the first method.

Figure 3:
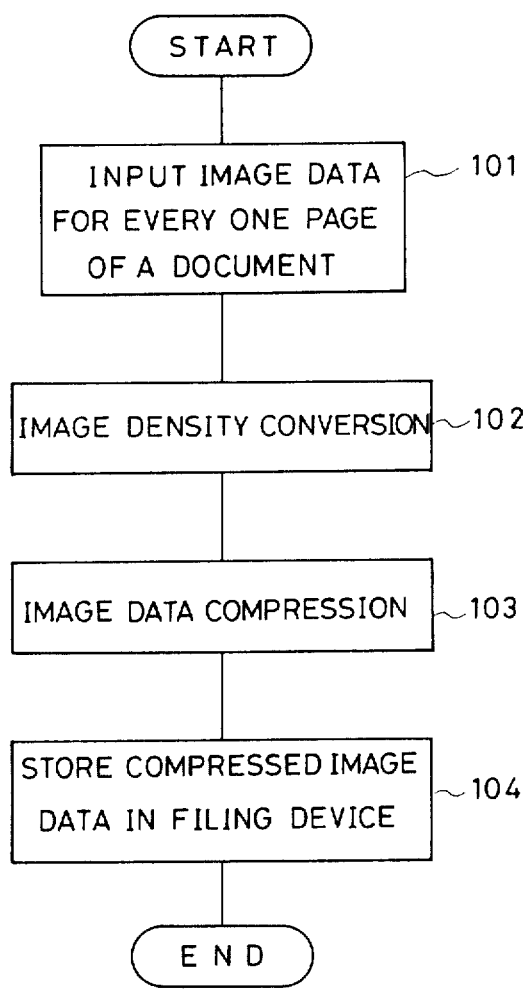
FIG. 3 is a flowchart showing a process for producing a retrieval-use-image data.

The retrieval-use-image data is produced in accordance with a sequence shown in FIG. 3. The sequence of FIG. 3 consists of steps 101 through 104. At step 101, image data (file data) to be filed is supplied from the scanner 17 to the memory 15 and is then stored therein. Thereafter, the image data is inputted into the image density converter 21 per every one page. Next, at step 102, the image data on each page is subjected to an image density conversion process executed by the image density converter 21.

FIG. 4A shows pixels of an original image data derived from the scanner 17, and FIGS. 4B through 4D show pixels of compressed image data which are obtained by subjecting the original image data of FIG. 4A to the image density conversion process. In FIG. 4A, P1 through P16 denote pixels, L1 through L4 denote lines in a sub-scanning direction $D_S$, and $D_M$ denotes a main scanning direction. Pixels X1 through X8 of the compressed image data of FIG. 4B are obtained by decimating the original image data of FIG.4A in the main scanning direction $D_M$. For example, pixels X1 to X4 correspond to pixels P1 to P4, respectively, and pixels X5 to X8 correspond to pixels P9 to P12, respectively. That is, lines L2 and L4 of the original image data of FIG. 4A are removed therefrom, and lines L1 and L3 are used as lines of the compressed image data of FIG. 4B. As another example, pixel X1 may be obtained by performing an OR operation between pixels P1 and P5, and pixel X5 may be obtained by performing an OR operation between pixels P9 and P13. In place of the OR operation, and AND operation may be used. Other logic operations may be used for producing the compressed image data.

Pixels Y1 through Y8 of FIG. 4C are obtained by decimating the original image data of FIG. 4A in the sub-scanning direction $D_S$. For example, pixels Y1, Y3, Y5 and Y7 correspond to pixels P1, P5, P9 and P13, respectively, and pixels Y2, Y4, Y6 and Y8 correspond to pixels P3, P7, P11, and P15, respectively. As another example, Y1 may be obtained by performing an OR operation between pixels P1 and P2, and Y2 may be obtained by performing an OR operation between pixels P3 and P4. Other logic operations may be used for producing the compressed image data.

Pixels Z1 through Z4 of FIG. 4D are obtained by decimating the original image data of FIG. 4A in both the main and sub-scanning directions $D_M$ and $D_S$. pixels Z1 through Z4 may be obtained by the combination of the decimations of FIGS. 4B and 4C.

Then, at step 103, the density-converted image data obtained at step 102 is subjected to the image data compression process executed by the data compression and reproduction circuit 14. The image data compression process for the density-converted image data may be performed in MH, MR or $M^2R$ coding scheme. The data obtained at step 103 is the retrieval-use-image data. Finally, the retrieval-use-image data produced per one page is stored in the optical disc unit 12a of the filing device 12 as the format described previously with reference to FIGS. 2A and 2B. The sequence of steps 102, 103 and 104 may be performed in the parallel or serial operation with respect to the data compression process for the compressed image data. In the parallel operation, it is possible to provide another data compression and reproduction circuit used exclusively for the data compression at step 103.

Figure 5A:
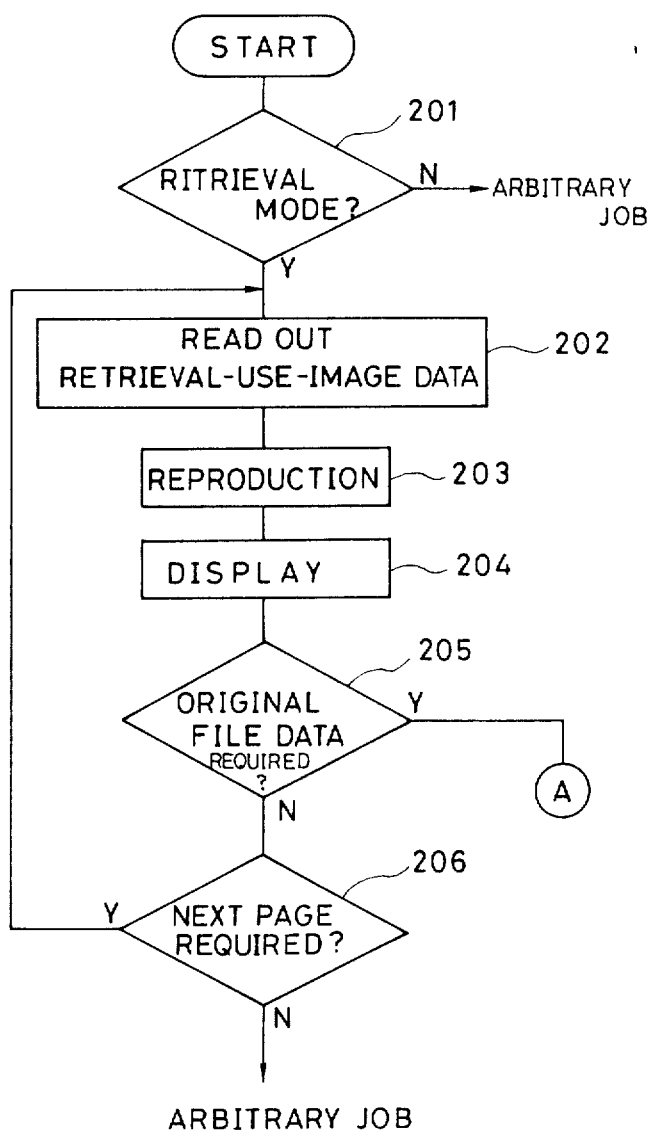
FIGS. 5A through 5C are flowcharts showing a file data retrieving operation of the embodiment.
Figure 5B:
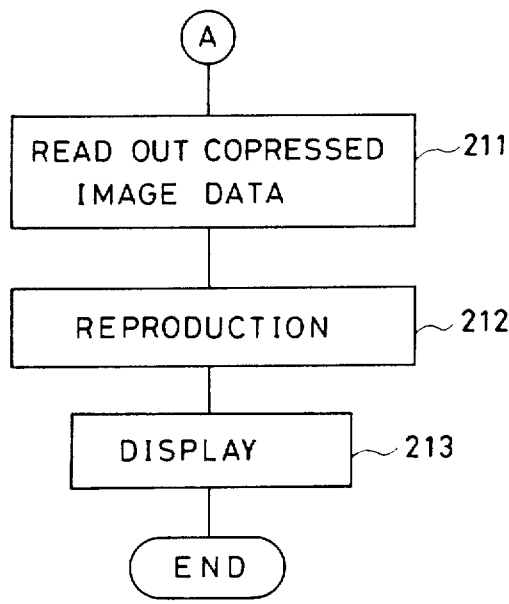
Figure 5C:
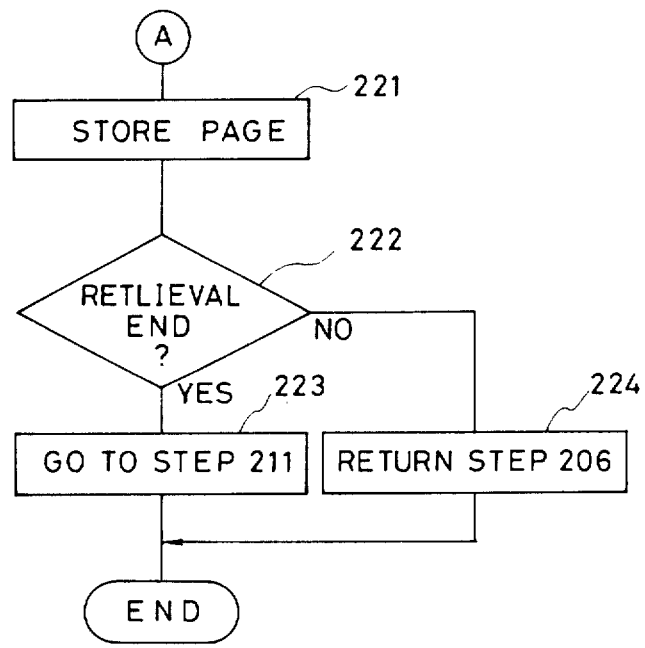

A description is given of an operation of the system of FIG. 1 with reference to a flowchart shown in FIGS. 5A through 5C.

At step 201, the CPU 11 checks whether the system is set to a file data retrieving mode. The file data retrieving mode may be instructed by depressing a corresponding function key of the keyboard 23. When the system is in the file data retrieving mode, the CPU 11 may execute an arbitrary job. Adversely, when the system is in the file data retrieving mode, the process precedes step 202, where retrieval-use-image data on one of pages which consist of a file is read out from the filing device 12. The order of read-out of retrieval-use-image data may be arbitrarily determined. For example, the retrieval-use-image data may be sequentially read out, starting with retrieval-use-image data positioned at the beginning of the retrieval-use-image data storing region IV shown in FIG. 2B. Also, the operator may input the desired order of read-out by using the keyboard 23. The inputted order of read-out is stored in the memory 15, and then the CPU 11 reads out retrieval-use-image data in accordance with the order provided by the operator. Further, a desired order of read-out of retrieval-use-image data may be pre-recorded on the hard disc unit 12b. In response to setting of the file data retrieving mode, the CPU 11 reads out the pre-recorded order from the hard disc unit 12b, and reads out the retrieval-use-image data in accordance therewith. For example, retrieval-use-image data of a file is sequentially read out for every one page. When the last retrieval-use-image data of the file F1 is completely read out, retrieval-use-image data of another file is sequentially read out for every one page. It is also possible to read out retrieval-use-image data on the first page of the file F1, and then to read out retrieval-use-image data for the first page of the document F2. Normally the first page of the document functions as a cover data sheet of a file.

Then step 203 is carried out, at which image data to be displayed is produced from the retrieval-use-image data. In this process, the retrieval-use-image data read out from the filing device 12 is supplied to the data compression and reproduction circuit 14, where the reverse process of step 103 is executed. Then, the expanded image data is supplied to the image density converter 21, where the reverse process of step 102 is executed. Particularly in the case where the retrieval-use-image data is data which has been decimated in both the main and sub-scanning directions $D_M$ and $D_S$ as shown in FIG. 4D, the retrieval-use-image data may be subjected to only the reverse processing of step 103. Then the reproduced image data is displayed on the CRT unit 20. It is noted that the reproduced image data obtained by the reverse processes of steps 102 and 103 is different in reproductivity from the reproduced data obtained by subjecting the compressed image data to the reverse process of the data compression process. That is, the former reproduced image data is somewhat degraded, compared with the latter reproduced image data. However, it is sufficient for the operator to check, without difficulty, file data, particularly with respect to a character of a relatively large size and a layout of the file data. It should be appreciated that the image data to be displayed for the file data retrieval can be reproduced from the retrieval-use-image data at a speed faster than that from the compressed image data filed.

Figure 6:
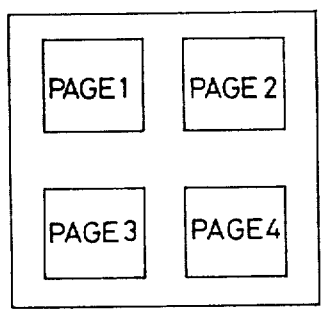
FIG. 6 is a view showing retrieval-use-image data on a plurality of pages which consist of a file.

Then, at step 104, the reproduced image data thus obtained is displayed on the CRT unit 20 per a unit of one page. Particularly, in the case where the displayed image data is reproduced from the retrieval-use-image data obtained in the main and sub-scanning directions $D_M$, and $D_S$ as shown in FIG. 4D, it is possible to display image data on a plurality of pages. For example, if the image data obtained by subjecting the retrieval-use-image data to the reverse process of steps 103 has a size of a quater times as large as the original image data, the image data on four pages may be displayed at one time as shown in FIG. 6.

Thereafter, at step 205, it is checked whether the file data reproduced from the compressed image data is requested for display. If the display of the file data is requested, the operator depresses a corresponding key of the keyboard 23. In response to this key depression, the CPU 11 supplies the filing device 12 with the corresponding file identification directory and file header. Then at step 211 of FIG. 5B, the corresponding compressed image data read out from the filing device 12 is fed to the data compression and reproduction circuit 14, where the file data is reproduced from the compressed image data (step 212). Then at step 213, the reproduced image data is supplied to the CRT unit 20 and is displayed thereon. On the other hand, at step 205, if the display of the file data is not requested, it is checked whether the display of file data on the next page is requested (step 206). If a result at step 206 is affirmative, the process returns to step 202. On the other hand, if a result at step 206 is negative, an arbitrary job may be executed.

The preferred embodiment aforementioned can speed up the retrieval operation, compared with the conventional retrieval, because image data to be displayed at the time of the retrieval is reproduced from the retrieval-use-image data which has an image density smaller than the compressed image data filed in the filing device 12.

As described previously, the next page to be selected at step 206 may be determined by the operator. Also, it is possible to select the next page in accordance with an attribute management defining a group of files having a close relationship. Further, in the above description, the file data is displayed every time when the display of the file data is requested. Alternatively, as shown in FIG. 5C, it is possible to store the page of file data which is requested for display (step 221) and to sequentially display file data on each of pages stored when the end of retrieving operation is requested (steps 222 and 223).

Figure 7A:
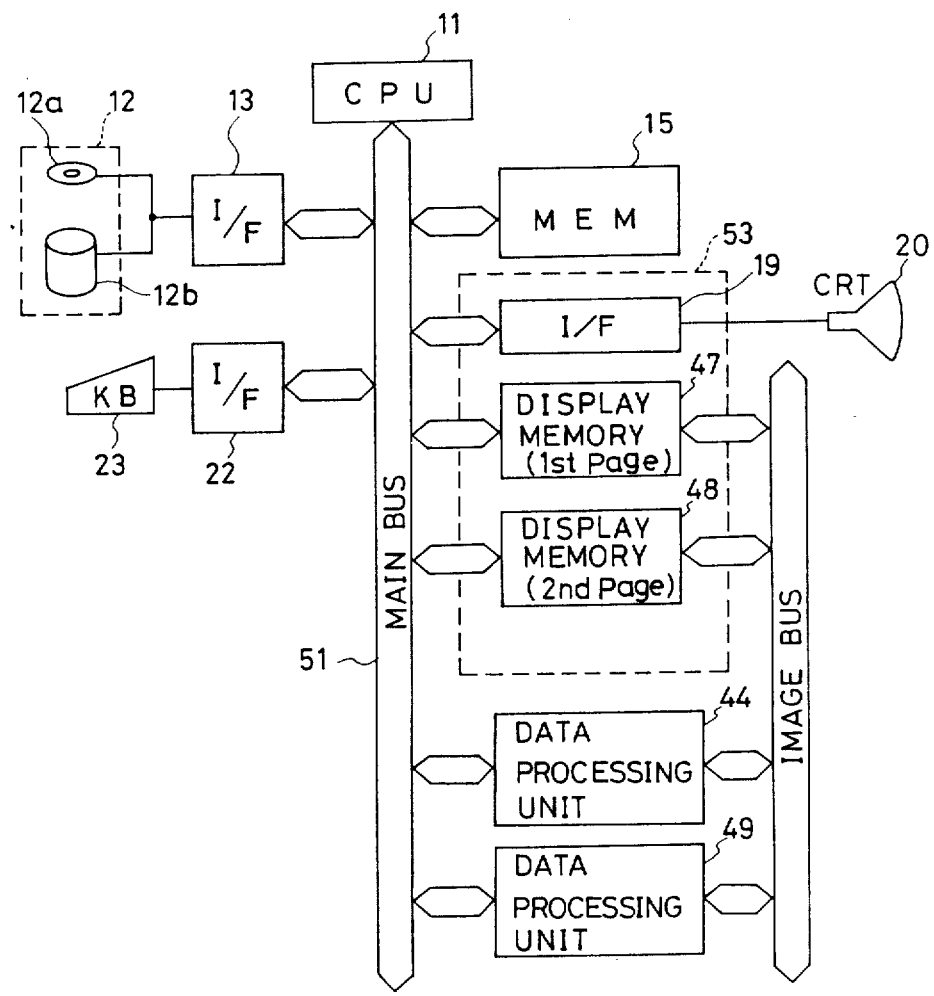
FIG. 7A is a block diagram of another preferred embodiment of the present invention.
Figure 7B:
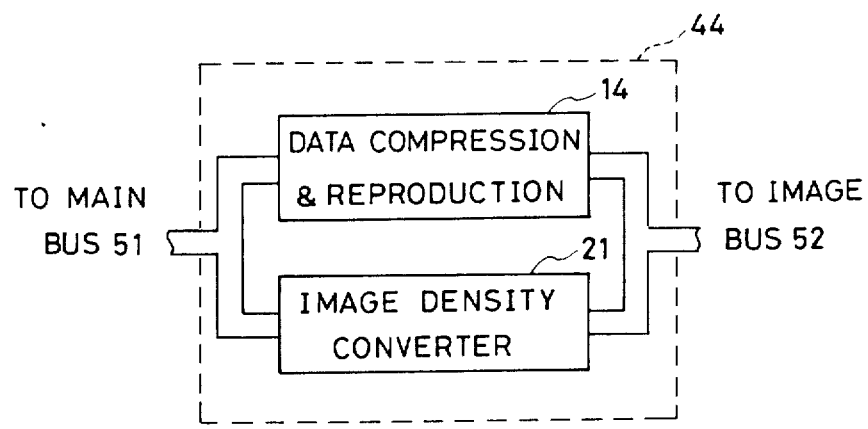
FIG. 7B is a block diagram of a data processing unit used in the embodiment of FIG. 7A.

A description is given of another preferred embodiment of the present invention with reference to FIGS. 7A, 7B, 8, 9A and 9B. In FIG. 7A, structural elements identical to those shown in FIG. 1 are indicated by the identical reference numerals. Referring to FIG. 7, the CPU 11, the filing device 12, I/F 13, memory 15, I/F 22 and keyboard 23 are connected to a main bus 51. In addition, two data processing units 44, 49 and a video I/F 53 are connected to the main bus 51. Each of the data processing units 44 and 49 has functions provided by the data compression and reproduction circuit 14 and the image density converter 21 shown in FIG. 1. That is, each of the data processing units 44 and 49 has a structure shown in FIG. 7B. The video I/F 53 includes the I/F 19 connected to the CRT unit 20, and two display memories 47 and 48, each of which has a storage capacity corresponding to at least one page of a document of a maximum size. The display memories 47 and 48, and the data processing units 44 and 49 are also connected to an image bus 52. That is, the display memories 47 and 48, and the data processing units 44 and 49 are dual port elements.

The reproduced image data, which has a high data quantity, is all passed through the image bus 52. This makes it possible to reduce a load on the main bus 51 due to a toggle processing described later.

Figure 8:
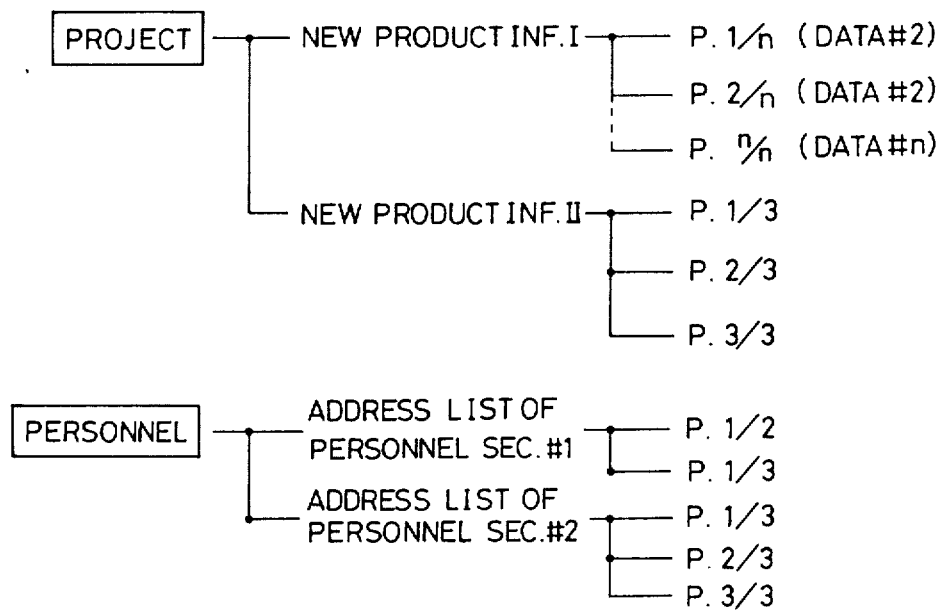
FIG. 8 is a view showing a filing structure used in the embodiment of FIG. 7.

In the present embodiment, an attribute management of files is employed. FIG. 8 is a view of a file structure for explaining the attribute management of files. As shown in FIG. 8, information (file) on "a project" consists of a file titled NEW PRODUCT INFORMATION #I having n pages and NEW PRODUCT INFORMATION #II having three pages. Similarly, information (file) on personnel consists of a file titled ADDRESS LIST OF PERSONNEL SECTION #1 having two pages and a file titled ADDRESS LIST OF PERSONNEL SECTION #2. In this manner, files having a close relationship (in other words, the same category) are managed by the file identification directories and file headers so as to be linked together as shown in FIG. 8.

Figure 9B:
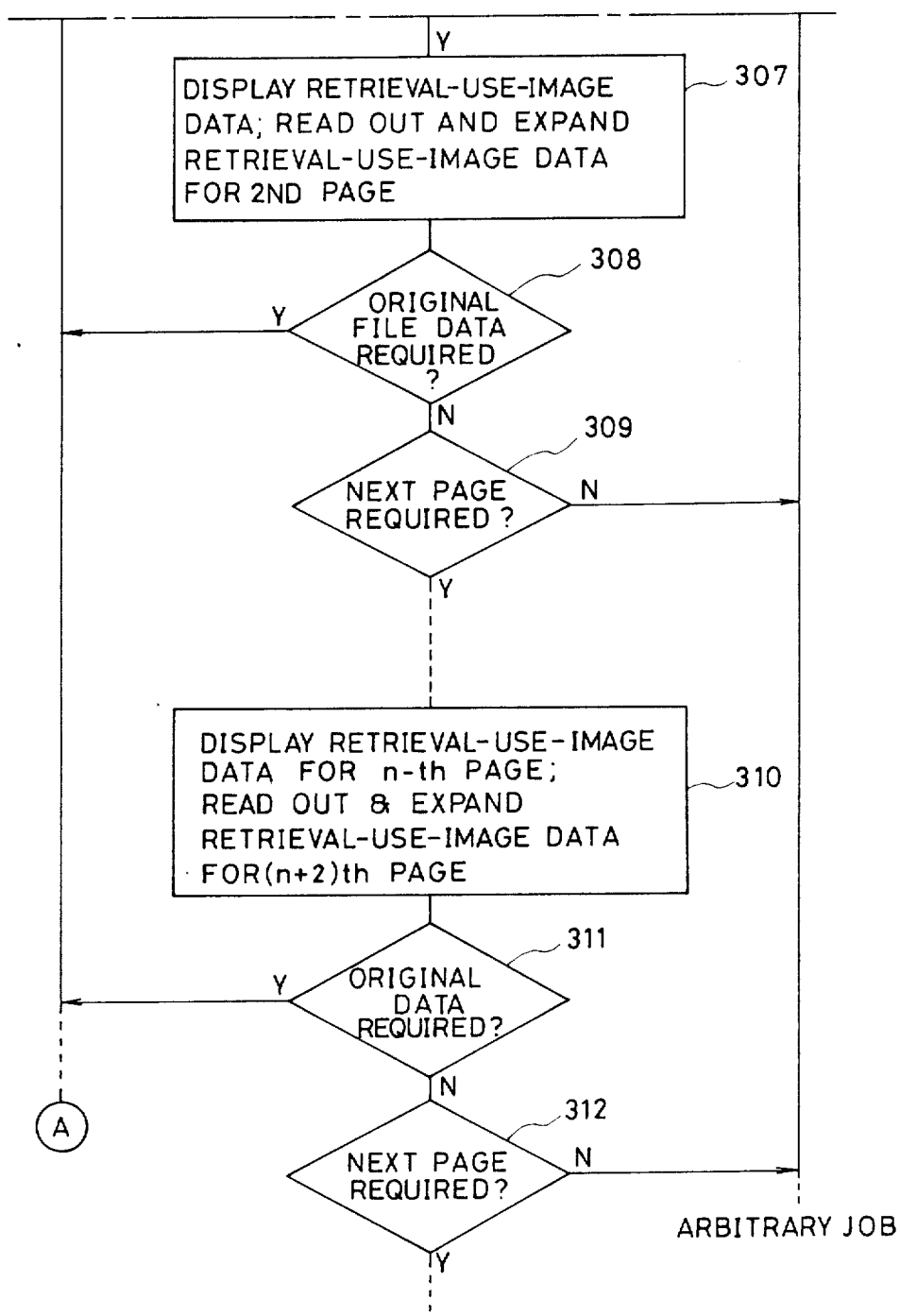

A description is given of an operation of the system of FIG. 7 with reference to a flowchart shown in FIGS. 9A and 9B.

First, at step 301, the operator provides the system with the retrieval mode by the keyboard 23. Subsequently, the operator requests the retrieval of files with regard to the project, for example, by using the keyboard 23. Then, at step 302, the CPU 11 reads out retrieval-use-image data with respect to the first page of the file titled NEW PRODUCT INFORMATION #I from the filing device 12. The retrieval-use-image data read out is supplied to the data processing unit 44 via the main bus 51. Then, the data processing unit 44 carries out the reverse processes of the data compression and density conversion aforementioned for the retrieval-use-image data. During this operation, the CPU 11 reads out retrieval-use-image data with respect to the second page of the same file from the filing device 12, and supplies the data processing unit 49 with it (step 303). Then the data processing unit 49 subjects the inputted retrieval-use-image data to the reverse processes (step 303).

Thereafter, when the reverse processes for the retrieval-use-image data with respect to the first page is completed, the image data produced from the retrieval-use-image data is sent to the display memory 47 through the image bus 52, and is then displayed on the CRT unit 20 (step 304). As soon as the reproduced image data is completely read out from the data processing unit 44 to the memory 47, retrieval-use-image data with respect to the third page of the same file is read out from the filing device 12 and is then supplied to the data processing unit 44. Then the data processing unit 44 carries out the reverse processes for the inputted retrieval-use-image data (step 304).

Next, at step 305, it is checked whether the file data to be obtained by the compressed image data (data #1) of the first page is necessary to be displayed at the time when the file data reproduced from the retrieval-use-image data with respect to the first page is being displayed. If not requested at step 305, it is checked at step 306, as to whether the retrieval of the next page is requested. At this time, if requested, the image data reproduced from the retrieval-use-image data for the data #2 is displayed. During this displaying operation, the retrieval-use-image data for data #4 is supplied to the data processing unit 49 and is subjected to the reverse processes. In this manner, the above operation is repetitively carried out. That is, while the image data reproduced from the retrieval-use-image data for the n'th page is being displayed, the image data to be reproduced from the retrieval-use-image data for the (n+2)'th page is read out and reproduced (step 310).

During the above operation, when the file data reproduced from the compressed image data is requested for display (step 305, 308 or 311), a process is carried out for reading out the compressed image data. This process may be identical to that shown in FIG. 5B or 5C. Then if the display of the next page is requested (step 306, 309 or 312), the process may be shifted to an arbitrary job.

According to the second preferred embodiment, when the image data reproduced from the retrieval-use-image data is displayed, the image data reproduced from the retrieval-use-image data for the next page is prepared for display, or in other words, has been reproduced. Therefore, an increased retrieval speed can be obtained.

In the second embodiment, the file data is retrieved in the order of page of the files having the close relationship. Alternatively, it is possible to retrieve file data with respect to the first page of each file. Further it is possible to retrieve file data with respect to the first page of each file having different categories.

In the preferred embodiments aforementioned, the retrieval of file data which is reproduced from character codes stored in the filing device is also carried out by displaying image data obtained from the retrieval-use-image data. Then when the original file data reproduced from character codes is requested for display, the CPU 11 reads out the character codes from the filing device 12 and produces image data therefrom. In this case, it is also possible to provide a character code expander for producing image data from a character code.

In the second embodiment, the retrieval-use-image data has an image density smaller than that of the compressed image data. Alternatively, the compressed image data itself may be used as retrieval-use-image data. In this manner, data compression and reproduction circuit is used in place of each of the data processing units 44 and 49 shown in FIG. 7A. That is, the image density conversion process is unnecessary. Further, more than two data processing units may be used in the second embodiment.

The present invention is not limited to the embodiments aforementioned, and variations and modifications may be made without departing from the scope of the present invention.

What is claimed is:

1. A file data retrieving system comprising:
    filing means for storing file data and retrieval-use-image data used for retrieving file data, the file data being stored in a predetermined data form, the retrieval-use-image data having an image density smaller than that of the file data;
    image data reproducing means for reproducing image data to be displayed from each of the file data and the retrieval-use-image data; and
    display means for displaying the image data supplied from the image data reproducing means, the display means displaying the image data reproduced from the retrieval-use-image data when retrieving the file data.

2. A file data retrieving system as claimed in claim 1, wherein the file data is compressed data obtained by compressing data to be filed, and the retrieval-use-image data has an image density smaller than the compressed file data.

3. A file data retrieving system as claimed in claim 2, further comprising instruction means for requesting display of file data reproduced from the compressed file data, and when a request of the display is instructed during the display of the image reproduced from the retrieval-use-image data, the file data is reproduced from the corresponding compressed file data and is displayed in place of the file data reproduced from the retrieval-use-image data.

4. A file data retrieving system as claimed in claim 2, wherein the retrieval-use-image data is stored in a storage area of the filing means identical to a storage area in which the compressed filing data is stored.

5. A file data retrieving system as claimed in claim 2, wherein the file data is divided into data portions on a plurality of pages, and the retrieval-use-image data is provided per every one page, and wherein the retrieval-use-image data is sequentially read out from the filing means per every one page of each file.

6. A file data retrieving system as claimed in claim 2, wherein the file data is divided into data portions on a plurality of pages, and the retrieval-use-image data is provided per every one page, and wherein the retrieval-use-image data with respect to a first page of each of the files is sequentially read out from the filing means.

7. A file data retrieving system as claimed in claim 2, wherein the file data is divided into data portions on a plurality of pages, and the retrieval-use-image data is provided per every one page, and wherein the retrieval-use-image data with respect to a first page of each of files having different categories is sequentially read out from the filing means.

8. A file data retrieving system as claimed in claim 1, wherein the data reproducing means carries out an image conversion for the retrieval-use-image data, so that the reproduced image data has the image density identical to that of the file data.

9. A file data retrieving system as claimed in claim 1, wherein the retrieval-use-image data is data obtained by reducing the image density of data to be filed and then compressing the density-converted data.

10. A file data retrieving system comprising:
    filing means for storing file data in a predetermined data form;
    at least two image data reproducing means each for reproducing image data to be displayed from the file data; and
    display means for displaying the image data supplied alternately from the two image data reproducing means when retrieving the file data.

11. A file data retrieving system as claimed in claim 10, wherein the file data stored in the filing means is compressed data obtained by compressing data to be filed.

12. A file data retrieving system as claimed in claim 10, wherein the filing means further stores retrieval-use-image data used for retrieving file data, the retrieval-use-image data having an image density smaller than that of the file data, and wherein when retrieving file data, image data to be displayed is reproduced from the retrieval-use-image data by data reproducing means and is then displayed by the display means.

13. A file data retrieving system as claimed in claim 12, wherein the retrieval-use-image data is stored in a storage area of the filing means identical to a storage area in which the filing data is stored.

14. A file data retrieving system as claimed in claim 10, wherein the file data is divided into data portions on a plurality of pages, and at the time of retrieval of file data, the file data is sequentially read out from the filing means per a unit of page of each file.

15. A file data retrieving system as claimed in claim 10, wherein the file data is divided into data portions on a plurality of pages, and the file data with respect to a first page of each of the files is sequentially read out from the filing means.

16. A file data retrieving system as claimed in claim 10, wherein the file data is divided into data portions on a plurality of pages, and file data with respect to a first page of each of files having different categories is sequentially read out from the filing means.

17. A file data retrieving system as claimed in claim 12, wherein each of the data reproducing means carries out an image conversion for the retrieval-use-image data, so that the reproduced image data has the image density identical to that of the file data.

18. A file data retrieving system as claimed in claim 12, wherein the retrieval-use-image data is data obtained by reducing the image density of data to be filed and then compressing the density-converted data.

* * * * *